United States Patent [19]

Botsolas

[11] Patent Number: 4,840,201
[45] Date of Patent: Jun. 20, 1989

[54] TWO PIECE PIPE FITTING COVER

[75] Inventor: Chris J. Botsolas, St. Petersburg, Fla.

[73] Assignee: Carol M. Botsolas, St. Petersburg, Fla.

[21] Appl. No.: 185,078

[22] Filed: Apr. 22, 1988

[51] Int. Cl.4 .............................................. F16L 57/00
[52] U.S. Cl. .................................... 138/178; 138/149; 285/45; 285/424; 285/915; 285/921
[58] Field of Search .................... 285/45, 47, 373, 419, 285/921, 424, 421, 915; 138/149, 156, 163, 178

[56] References Cited

U.S. PATENT DOCUMENTS

| | | |
|---|---|---|
| 2,756,172 | 7/1956 | Kidd . |
| 3,406,987 | 10/1968 | Hunder et al. ................ 285/424 X |
| 3,443,599 | 5/1969 | Klein . |
| 3,495,629 | 2/1970 | Botsolas et al. . |
| 3,560,287 | 2/1971 | Helling . |
| 3,732,894 | 5/1973 | Botsolas . |
| 3,771,820 | 11/1973 | Hoss et al. .................... 285/915 X |
| 3,955,601 | 5/1976 | Plummer ............................ 138/149 |
| 3,960,181 | 6/1976 | Baur et al. . |
| 3,989,281 | 11/1976 | Wilde ................................... 285/45 |
| 4,139,026 | 2/1979 | Zack . |
| 4,553,308 | 11/1985 | Botsolas . |
| 4,605,046 | 8/1986 | Grenier ............................ 138/149 |
| 4,627,995 | 12/1986 | Botsolas . |
| 4,669,509 | 6/1987 | Botsolas . |

FOREIGN PATENT DOCUMENTS 881184 6/1953 Fed. Rep. of Germany ...... 285/419
774641 12/1934 France ............................. 285/419

Primary Examiner—Dave W. Arola
Attorney, Agent, or Firm—Hedman, Gibson, Costigan & Hoare

[57] ABSTRACT

A cover comprised of two half sections which have end portions that interlock in place to form a closed cover. More specifically, a pipe fitting cover that is used to protect various types of pipe fittings against the intrusion of water and other elements.

12 Claims, 3 Drawing Sheets

TWO PIECE PIPE FITTING COVER

FIELD OF THE INVENTION

This invention relates to a cover and a process for covering pipe fittings. More specifically, this invention relates to a two-piece pipe fitting cover which interlocks into place over both insulated and uninsulated piping.

BACKGROUND OF THE INVENTION

The conveyance of hot or cold fluids through piping and piping assemblies normally makes it desirable to insulate and cover the piping. Usually, this involves wrapping or placing an insulation blanket over the exterior of a pipe fitting and covering the insulation.

Early efforts at insulating a pipe fitting consisted of spreading cement in place on the exterior of the pipe fittings and then adhering a fabric covering over it. Prior art procedures have progressed since then to include aluminum and plastic covers for the pipe fittings, used in conjunction with insulation materials such as fiberglass blankets or urethane foam. In some instances, the insulation blanket is adhered to the inside surface of the cover such that the insulation and cover are joined in place at the same time. In other instances, the insulation is first formed or placed around the pipe fittings and the aluminum or plastic covers are then secured in place over the insulation.

Improvements in pipe fitting covers are described in several patents, e.g., U.S. Pat. No. 3,495,629 (Botsolas, February 1970), U.S. Pat. No. 3,732,894 (Botsolas, May 1973), U.S. Pat. No. 4,553,308 (Botsolas, November 1985) and U.S. Pat. No. 4,669,509 (Botsolas, May 1986), all of which are incorporated herein by reference, in which a variety of pipe fittings have been provided with standardized one or two-piece protective covers. U.S. Pat. No. 4,553,308, for example, provides a pipe fitting cover formed of two half sections, having toroidally contoured sections on each end, which can be used to cover a variety of diameters of flanged pipe fitting members. However, the side and end portions of two-piece pipe fitting covers overlap when installed over pipe fittings. These overlapping portions often have large gaps which allow for seepage of water and other elements. The seepage of water and chemicals, for example, tends to break down the insulation which causes the piping to suffer corrosion, chemical attack and rust. Often, four or five pop rivets or screws are installed through the overlapping portions to close up the gaps. However, the gaps are usually left open without any screws, because of the difficulty in hand drilling screw holes into varied positions along the cover. Further problems are associated with rivets and screws when used with aluminum covers. The inside of aluminum covers are coated with epoxy paint in order to prevent corrosion of the aluminum from the alkali generated from within. When holes are drilled for the pop rivets or screws, the epoxy shield is broken which creates areas of potential corrosion. It has been known in certain instances where aluminum covers installed over pipe fitting insulation were completely eaten through from this type of corrosion in as little as three months after installation.

SUMMARY OF THE INVENTION

Accordingly, it is an object of the present invention to provide a pipe fitting cover wherein one section of the cover interlocks with the other section.

It is a further object of the present invention to provide a pipe fitting cover that will have no gaps between the interlocking portions of the two sections.

It is a further object of the present invention to provide a pipe fitting cover that will prevent the intrusion of water and other elements.

It is a further object of the present invention to provide a pipe fitting cover which can be easily installed over a pipe fitting.

These and other objects are attained herein by a pipe fitting cover which is formed of two half sections where the half sections are contoured to the shape of the piping being covered.

The two half sections that comprise the cover each have two opposing sides with seams which are defomed to a shape to allow each half section to overlap and interlock into the outer forming a closed pipe fitting cover having no gaps. This will substantially limit the need for pop rivets, screws or any other special tools that are required to hold the cover in place. The usual gaps present with the overlapping end portions of conventional two piece pipe fitting covers have been substantially eliminated with the use of the interlocking side seams of the present invention. Application of silicone caulking in one side seam will securely adhere the two half sections in position and will further prevent water intrusion.

DESCRIPTION OF THE DRAWINGS

The accompanying drawings referred to herein and constituting a part thereof, illustrate the preferred embodiments of the invention and together with the description serve to explain the principles of the invention.

DESCRIPTION OF THE PREFERRED EMBODIMENT

For purposes of this Specification, unless otherwise specified, the term "pipe fitting" refers to a fitting in general, whether or not specifically part of a pipe, per se, including but not limited to elbows, valves, flanges, unions, as well as various specialty fittings. Also, unless otherwise specified, the term "piping" refers to both insulated and uninsulated piping.

The present invention is suitable for use in any installation where an easy to install, protective pipe fitting cover is needed.

Figure 1:
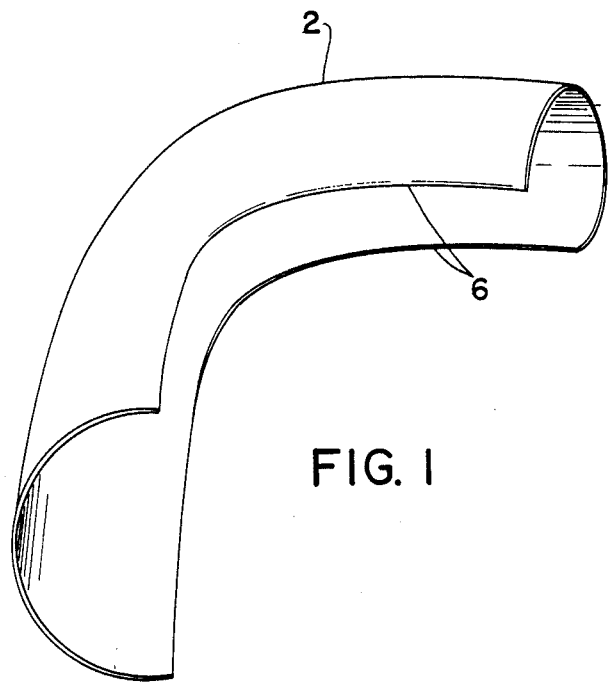
FIG. 1 is a perspective view of the one half section of a precut pipe cover material adapted for an elbow pipe with two opposing straight ends.
Figure 2:
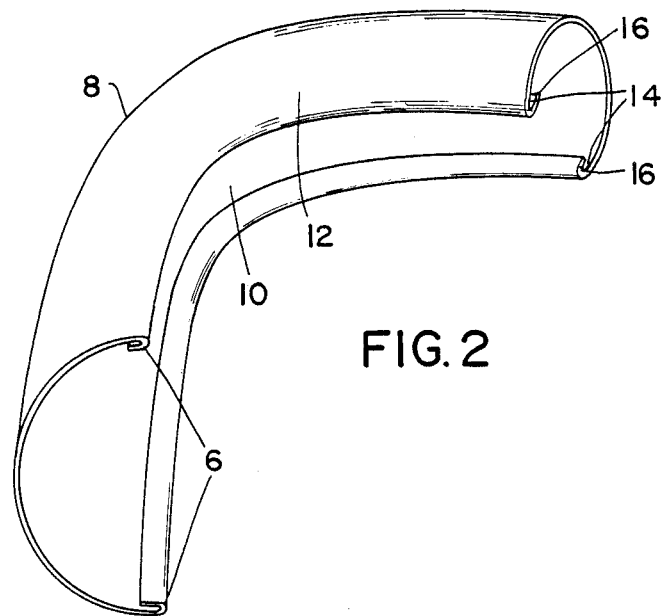
FIG. 2 is a perspective view of the half section of FIG. 1 wherein the two straight ends have been deformed to provide means for interlocking two half sections together.

FIG. 1 shows a half section of a precut pipe cover material (2) adapted for fabrication into a half section of a pipe cover (4) of the present invention as shown in FIG. 2, with opposed side seams (6).

FIG. 2 depicts a half section (4) of a pipe cover adapted for an elbow fitting wherein the half section (4) has a body (8) with an interior surface (10) and exterior surface (12). The opposing side seams (6) have been deformed to form a groove (14) and a lip (16) extending from the groove (14). The groove (14) of the half section (4) is formed between the lip (16) and interior surace (10). The lip (16) can extend from the groove (14) substantially parallel to either of the interior surface (10) or exterior surface (12) of the half section (4) of the present invention. The deforming of said side seams (6) is accomplished through the use of accepted sheet metal techniques.

Figure 3:
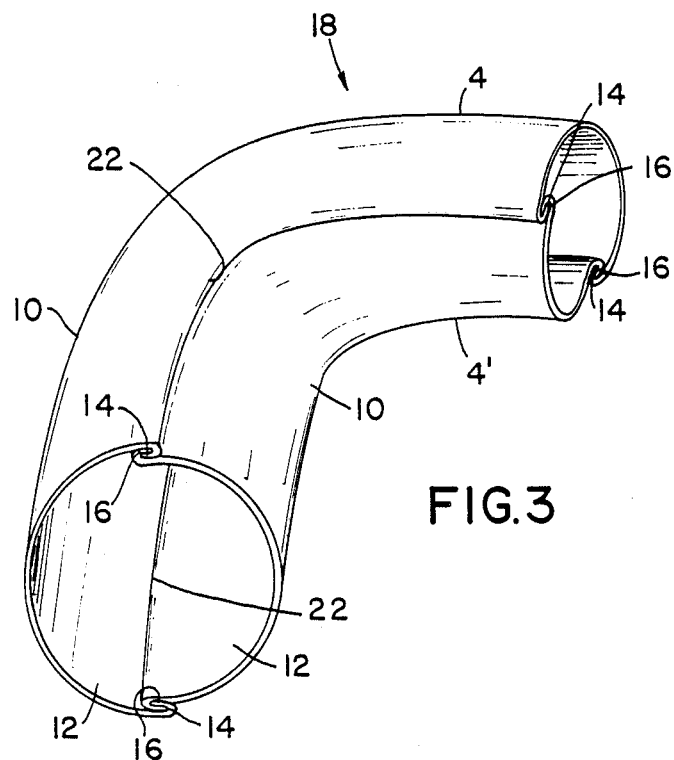
FIG. 3 is a perspective view of a pipe fitting cover of the present invention with two half sections in opposed interlocking relationship.
Figure 4:
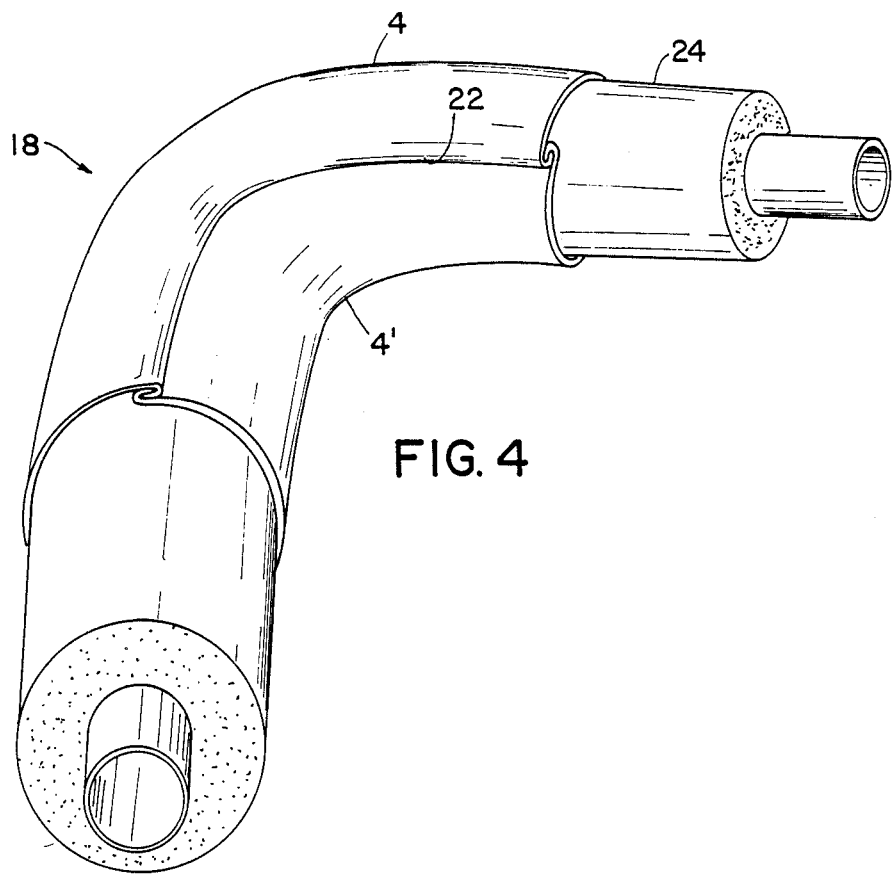
FIG. 4 is a perspective view of a pipe fitting cover similar to FIG. 3 installed around an elbow pipe.

FIGS. 3 and 4 depict an elbow pipe cover (18) of the present invention comprised of two half sections (4) and (4') were each half section (4) and (4') is contoured in shape to fit around an elbow-shaped pipe fitting (24). Each half section (4) and (4') is comprised of opposing side seams (6) where the side seams (6) of the first half section (4) have a groove (14) that has been formed between the lip (16) and the interior surface (10) and the side seams (6) of the second half section (4') have a groove (14) that has been formed between the lip (16) and the exterior surface (12). The side seams (6) are the means which connect the two half sections (4) and (4') together to form a closed elbow pipe cover (18).

Figure 5:
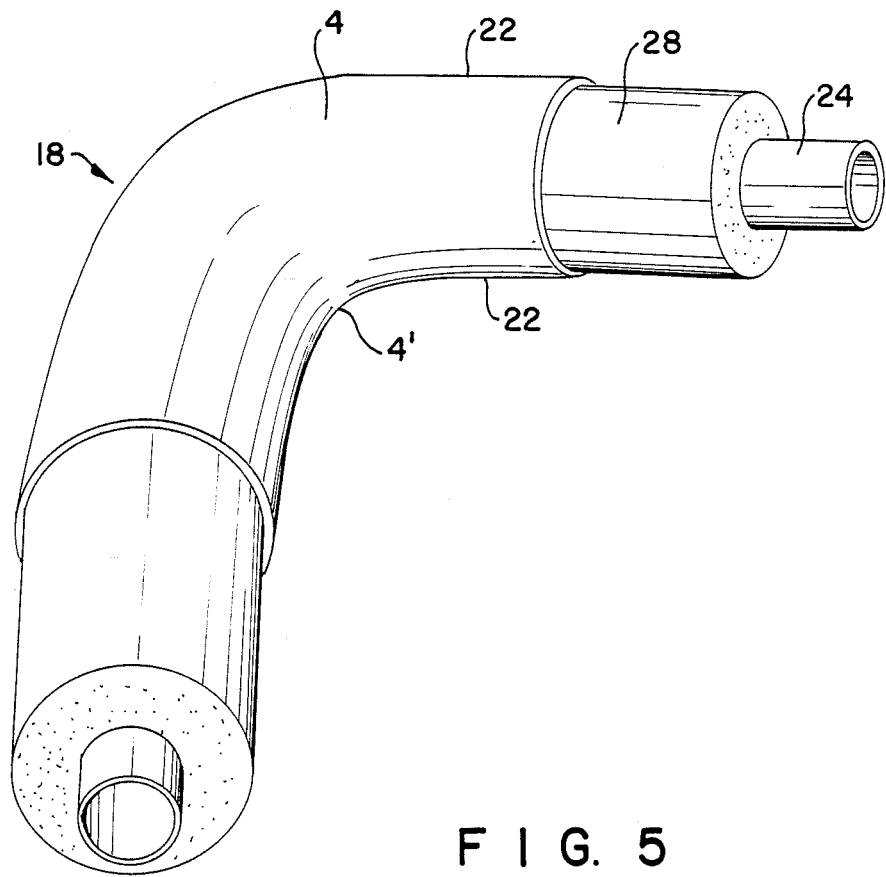
FIG. 5 is a perspective view of a pipe fitting cover of the present invention where the two half sections have side seams which are perpendicular to the side seams shown in FIG. 4.

FIG. 5 depicts an elbow pipe cover (18) comprised of two half sections (4) and (4') where each half section (4) and (4') is comprised of side seams (6) that are perpendicular in position to the side seams (6) seen in FIG. 4. FIG. 5 depicts the preferred embodiment of the present invention since it allows both half sections (4) and (4') to be cut from one die.

A caulking compound, silicone or any other type of suitable adhesive that has a long term life again intrusion of water and other elements can be applied into the side seams (6) before connecting the two half sections (4) and (4') together. The adhesive is to be applied to the side seams (6) of at least one half section (4) or (4').

After the adhesive is applied, the two half sections (4) and (4') are lined up around the elbow-shaped pipe fitting (24) seen in FIGS. 4 and 5. The two half sections (4) and (4') are then pushed together until the side seams (6) overlap. This pushing activity can be accomplished manually, or with the use of temporary spring clamps or any other clinching device (not shown). Once overlapped, the half sections (4) and (4') are pressed together so that the side seams (6) are in an interlocking position over the fitting. This pressing can be achieved manually or by a tapping persuasion. The side seams (6) of the half sections (4) and (4') when interlocked, create a lock seam (22) as seen in FIGS. 4 and 5. A watertight seal is insured by application of an adhesive into the side seams (6) of at least one half section (4) or (4'). The side seams (6), once interlocked in place, generally do not require any pop rivets or screws for the lock seam (22). The applied adhesive will insure against the presence of any gaps in the lock seam (22). The adhesive further insures against intrusion from any outside elements. Due to the limited use or absence of screws or pop rivets, the elbow pipe cover (18) provides protection against elements such as water and chemicals since the barrier formed by the interlocking side seams (6) is not broken. Where an occassional screw or pop rivet is required, it can be applied through a mound of silicone to preserve the integrity of the elbow pipe cover (18). If the shape of the pipe fitting is such so that side seams (6) are difficult to interlock, the side seams (6) can be replaced by a spline (not shown) which can be of metal or plastic. The spline will be attached to a pipe fitting cover of the present invention by pressing, screws, rivets or adhesives.

The resiliency of the pipe insulation (28) as seen in FIG. 5 is used as a spring for holding a pipe fitting cover in place around the pipe. In applications where non-resilient pipe insulation is used, an elbow pipe cover (18) is installed around the elbow-shaped pipe fitting (24) first. The insulation is then installed around the elbow-shaped pipe fitting (24) above the elbow pipe cover (18) and slid into each end of the elbow pipe cover (18).

The pipe cover of the present invention can be made from aluminum or other metal, thermoformed plastic, or fiberglass reinforced polyester or other similar resins. The two half sections (4) and (4') that comprise the pipe cover (18) seen in FIGS. 3 and 4 are to be formed by the conventional and known methods of hydraulic, electro-shape, explosive or stretch forming. The dimensions of the half sections (4) and (4') are to be made close to the ASTM standard dimensions established for the outside diameter of fiberglass and other pipe insulations. Where the half sections that comprise the cover are made from thermoformed plastic, fiberglass reinforced polyester or other resin, said half sections also can be formed by the methods known as injection molding, thermoforming sheet molding, reaction molding or resin transfer molding. The thickness of the material for the pipe fitting cover is typically between about 0.010" to 0.125".

The invention in its broadest aspects is not limited to the specific embodiments described above and in the accompanying drawings, and departures may be made from the specific embodiments which are within the scope of the appended claims without departing from the principles of the invention and without sacrificing its chief advantages.

I claim:

1. A cover adapted to be placed about an insulated or uninsulated pipe fitting comprising:
   two half sections each comprising a body having an interior surface and an exterior surface and two edges;
   a pair of opposed side seams extending along each edge of each said half section, said side seams comprising a groove and a lip extending from said groove, the groove of one half section being located between the lip and the interior surface of said half section and the groove of the other half section being located along each edge between the lip and the exterior surface, each said lip being substantially parallel to a surface of said body, and wherein said lip of each side seam of one half section is adapted to be transversely insertable into and interlock with the corresponding groove of the other half section, when the half sections are secured about a pipefitting to create a lock seam between said half sections.

2. A cover according to claim 1, wherein an adhesive means is applied to the side seams of at least one half section.

3. A cover according to claim 2, where the adhesive means is a caulking compound.

4. A cover according to claim 2 where the adhesive means is silicone.

5. A cover according to claim 1, which is made of metal.

6. A cover according to claim 5, in which the metal is aluminum.

7. A cover according to claim 5, wherein the thickness of the metal is between about 0.010" to 0.0625".

8. A cover according to claim 1, which is made from thermoformed plastic.

9. A cover according to claim 8, where the thickness of material is between about 0.010" to 0.0625".

10. A cover according to claim 1, which is made from fiberglass reinforced polyester.

11. A cover according to claim 10 where the thickness of the material is between about 0.032" to 0.125".

12. A process for covering an insulated pipe fitting with a cover, comprised of two half sections contoured to the shape of the pipe fitting being covered, where the two half sections have opposing side seams comprised of a groove and a lip extending from said groove, where the lip of each side seam of one half section is adapted to interlock with the corresponding grooves of the second half section when the half sections are secured about the pipe fitting and pipe insulation, comprising the steps of:
- (a) moving the two half sections over the pipe fitting to be covered so that the two half sections are in an opposing relationship,
- (b) pushing the two half sections together so that the side seams of each half section overlap,
- (c) pressing the two half sections together using the resiliency of the pipe insulation so that the side seams of each half section interlock in place over the pipe fitting, so that the interlocking side seams create a lock seam.

* * * * *